Dec. 17, 1957  J. S. TUSHINSKY ET AL  2,816,480
PRISM TYPE ANAMORPHOSCOPIC DEVICE
Filed Nov. 23, 1953  2 Sheets—Sheet 1
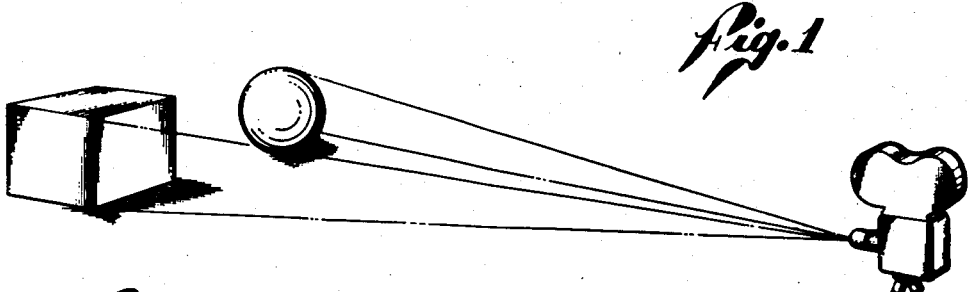
Fig. 1
Fig. 2   Fig. 2a
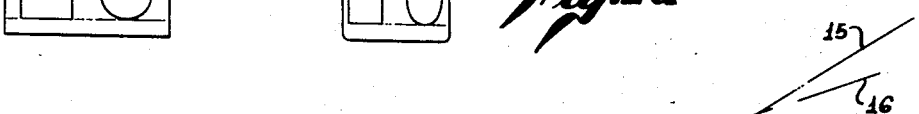
Fig. 3
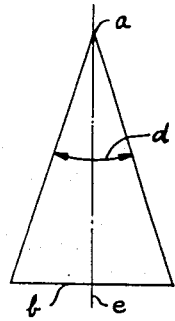
Fig. 4
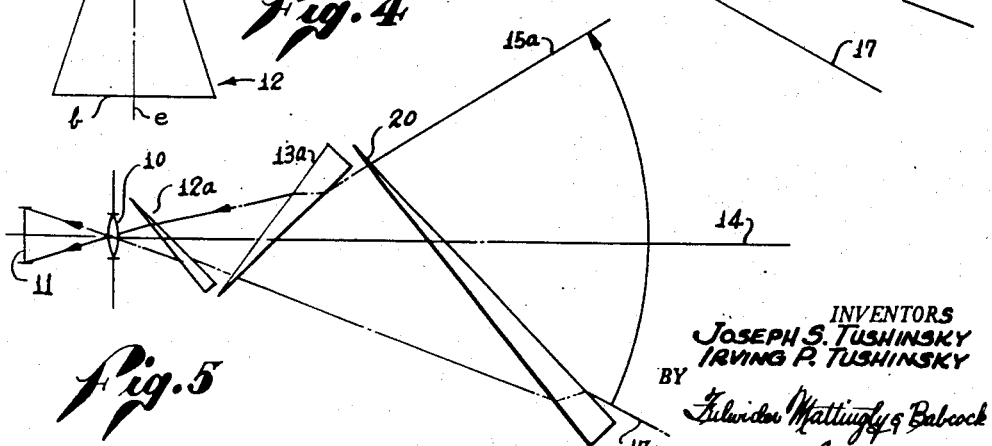
Fig. 5
INVENTORS
JOSEPH S. TUSHINSKY
IRVING P. TUSHINSKY
BY
Fulwider Mattingly & Babcock
Attorneys

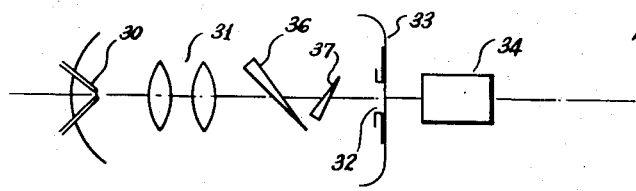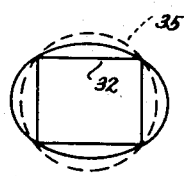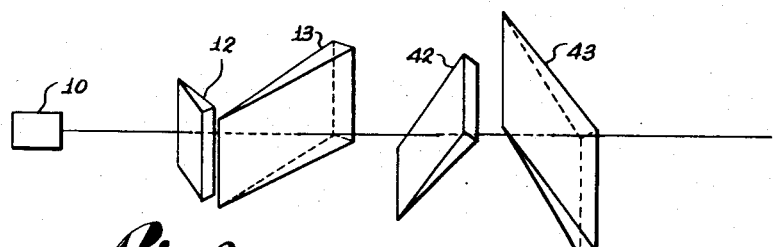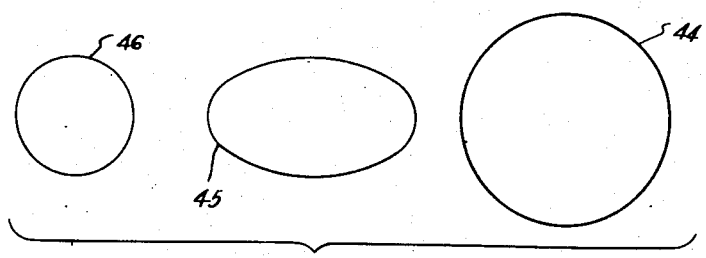

United States Patent Office 2,816,480
Patented Dec. 17, 1957

2,816,480

PRISM TYPE ANAMORPHOSCOPIC DEVICE

Joseph S. Tushinsky, North Hollywood, and Irving P. Tushinsky, Van Nuys, Calif., assignors to Superscope, Inc., a corporation of California Application November 23, 1953, Serial No. 393,716

4 Claims. (Cl. 88—57)

This invention relates generally to apparatus for increasing or decreasing the field included within an optical image, and more particularly relates to apparatus for augmenting or diminishing the field angle in a manner similar to that of a cylindrical lens, but without the use of any lens. Such a device may be designated as an anamorphoscope.

In photography, whether still, motion picture, or television, it is often desirable to be able to record a fairly wide field, without increasing the height of the field. Thus, where the conventional photographic image may be approximately three units high by four units wide, giving an aspect ratio of 1:1.33, it may be desirable to provide a photograph having an aspect ratio of 1:2.0 or 1:3.0. A short focal length lens will generally cover a wide angle of field, and hence the name "wide angle" lens, but such a lens will not change the aspect ratio of the finished picture. Heretofore, the aspect ratio has usually been changed by use of a camera that is rotated about a vertical axis to produce a panoramic view, or by taking a plurality of pictures and then piecing them together.

However, neither of these solutions is satisfactory if a single exposure is to be made, and a picture of the desired aspect ratio is to be obtained thereby. It is possible, of course, to make use of a cylindrical lens aligned with the more or less conventional objective lens, and thus, in effect compress the image so that a wider field angle, in a horizontal direction, is covered by the lens, and included in the resulting image formed upon the film or other photosensitive material. Such lenses, however, are quite complicated, and one form of such lens is shown in the patent to Chrétien, No. 1,962,892, issued June 12, 1934, for an "Anamorphoscopic Lens System and Method of Making the Same."

It will be recognized that such a lens system is used with an objective lens of usual construction, but normally works best with a lens whose focal length falls within a certain range. Such systems require difficult and involved computations, and are, as a result, quite expensive.

Recently there has been an effort on the part of motion picture producers to provide projected images having an aspect ratio of between 1:2 and 1:3, thereby achieving a greater realism from the point of view of the spectator. The anamorphoscopic lens system has been used in some instances, and in other cases, a plurality of cameras and projectors have been operated in synchronism so that, in effect, a plurality of pictures are placed together, side-by-side, thereby providing a form of panoramic view. Each of the systems is expensive in use, and neither has the adaptability and flexibility that is desired. However, it has now been found to be possible to expand or compress images in the same general manner as the anamorphoscopic lens system of Chrétien, but without the use of specially ground lens elements, and without the use of a plurality of cameras and projectors.

It is therefore a major object of this invention to provide apparatus for expanding or compressing an optical image in one dimension.

It is a further object of the invention to provide such system that makes use of optically plane surfaces without any curvature therein, thereby greatly simplifying the manufacture of such devices.

It is a further object of this invention to provide such apparatus that may be used with any existing lens system without change therein.

Still another object of the invention is to provide a system that does not materially reduce the amount of light transmitted through the normal objective lens, so that exposure problems are not increased.

It is a still further object of the invention to provide a device that, while expanding or compressing the image in one meridian, can be combined with a similar device adapted to expand or compress an image in a perpendicular meridian, and can thereby be used to provide the effect of a telephoto lens of varying focal length.

These and other objects of the invention will become apparent from the following description of several forms thereof, and from the drawings illustrating those forms, in which:

Figure 1 is a perspective view of a camera equipped with the image-controlling device, and photographing a scene composed of a sphere and a cube;

Figure 2 is a view of the scene shown in Figure 1 as it normally appears, when the actual objects are observed by an observer, or when the scene is projected by appropriate means onto a screen;

Figure 2a is a view of a frame of motion picture film, taken with the aid of the image-controlling device, in which the horizontal dimension of the image of Figure 2 has been compressed to fit within the standard motion picture frame;

Figure 3 is a schematic view of the optical elements necessary to produce one form of the image-controlling device;

Figure 4 is an end elevational view of an optical wedge or prism, indicating the various portions thereof;

Figure 5 is a schematic view of the elements necessary to produce an alternate form of the image control device;

Figure 6 is an end elevational view, similar to Figure 4, showing the construction of an achromatic wedge;

Figure 7 is a schematic view of the image control device incorporated within the lamp house of a motion picture projector for the purpose of increasing the light transmitted through the film;

Figure 8 is a view showing the shape of the cone of light projected upon the aperture plate of the projector shown in Figure 5;

Figure 9 is a schematic perspective view illustrating the construction of a somewhat more elaborate device intended to produce a variable telephoto effect; and Figure 10 is a schematic representation of the various images at various points in the system shown in Figure 9.

Referring now to the drawings and particularly to Figures 1, 2, and 2a thereof, the use of the present invention in the production of so-called wide screen motion pictures is illustrated. One of the reasons for the popularity of the wide screen process is that the projected picture covers a larger portion of the normal field of vision, and as a result, a more natural and life-like appearance is obtained. In viewing an object in nature, the eyes converge upon the principal portion of the subject, and this portion is seen with the greatest clarity. However, the area surrounding the principal portion is also seen, though less clearly, and this peripheral vision has become an integral part of the mental processes associated with viewing a scene in nature. The side or lateral portions of the peripheral field are more important than the vertical portions, since in nature, a large amount of the vertical portion of the peripheral field is occupied by the sky, a ceiling, or other plain object. While the utmost in realism would be provided by a field approximating that of a hemisphere, in actual practice this can be greatly reduced.

It has been found that a projected picture having an aspect ratio of 1:2 to 1:3 produces very satisfactory results, with a greatly increased illusion of reality, and while this aspect ratio can be obtained by using wider film, or by using a portion of the standard 35 mm. frame, the results in either case are uneconomic. It has been proposed to compress the image, in one meridian, by use of the anamorphoscopic lens system previously mentioned, and while the results are satisfactory and somewhat spectacular, the cost of the necessary lenses soon becomes prohibitive. Aside from the cost of the lens system, however, the lateral compression of the image offers a practical and economical solution to the problem. Thus, standard 35 mm. film may be used, and the entire frame area thereof may be used, so that an image normally seen as shown in Figure 2, will be laterally compressed so that the image upon the film will have the appearance shown in Figure 2a. By reversing the process, and by projecting the image shown in Figure 2a through the herein described modifier, the projected image appearing upon the screen will be returned to its normal proportions and have the appearance indicated in Figure 2.

As previously mentioned, the present image modifier makes use of a standard or conventional objective lens, and in Figure 3, such a lens is indicated by the numeral 10, and forms an image upon a photosensitive surface 11 in the conventional manner. Mounted in front of the lens 10 and aligned with the optical axis thereof are a pair of prisms or optical wedges 12 and 13. The prism 12, which is nearer the lens 10, is designated as the rear prism, and the prism 13, remote from the lens, is designated as the front prism. Designating the base of the prism as the surface through which useful light neither enters or emerges, the bases of the prisms 12 and 13 are in vertical planes, so that the prisms cause a horizontal deviation of the light passing through them.

The base of the rear prism 12 is on one side of the optical axis 14 of the lens 10, for example the right hand side when looking from the lens toward the prisms; and the front prism 13 has its base on the opposite side of the optical axis, for example on the left side of the axis. To provide a compression of the image or light first passing through the front prism 13, then through the rear prism 12, and finally through the lens 10, the rear prism 12 is rotated about a vertical axis so that the apex of that prism is nearer the plane of the lens than is the base. In a similar manner, the front prism 13 is rotated about a vertical axis to a point where its apex is nearer the rear prism 12, than is its base. The prisms thus are positioned to form a V, and this position of the front and rear prisms 12 and 13 and the lens 10, is indicated in Figure 3.

In Figure 4, there is indicated a plan view of a prism, such as the rear prism 12, though drawn to a somewhat distorted scale, wherein the apex of the prism has been indicated by the letter $a$, and the base of the prism has been indicated by the letter $b$. The dihedral angle formed between the entrant and emergent faces of the prisms, commonly called the angle of the prism or optical wedge, is designated by the letter $d$, and the bisector of this dihedral angle, indicated by the dot-dash line passing through the prism, is designated as the axial plane or axis $e$ of the prism.

Returning again to Figure 3, in the simplest form of this invention, the prisms 12 and 13 have the same prism angle $d$ and their axial planes $e$ make approximately the same angle with the optical axis 14. With the front and rear prisms 12 and 13 positioned approximately as shown, light rays from the subject will be deflected in the general manner indicated in Figure 3. Thus, a light ray 15, coming from the extreme left side of the field, will first strike the front surface of the front prism 13 and be deflected so that as that ray leaves the rear surface of that prism, it is more nearly parallel to the optical axis 14. Thereafter, the ray 15 passes through the rear prism 12, again being deflected in its passage therethrough, but this time being deflected in the opposite direction. As a result, when the ray 15 leaves the rear surface of the rear prism 12, it makes an angle with the optical axis 14 that is within or at the edge of the normal angle of field of the lens 10. The line 16 indicates the left hand boundary of the normal angle of the lens 10.

It will be noted that the ray 15 makes first a greater angle to the optical axis than the ray 16 but after passing through the front prism 13, the ray 15 makes a smaller angle than the normal ray 16. Finally, after passing through the rear prism 12, both rays make the same angle to the optical axis 14.

On the opposite side of the device, the right hand side, a ray 17 from the right hand edge of the field first strikes the front prism 13 and is deflected so that after emerging from that prism, it makes a greater angle to the optical axis 14, than it previously did. Thereafter, the ray 17 passes through the rear prism 12 and is again deflected, this time emerging so that it makes a smaller angle to the optical axis 14, and this angle is the same as the normal angle of the lens 10. The line 18 indicates the normal extreme ray on the right hand edge of the field as the lens 10, corresponding to the ray 16 on the left hand side.

It thus will be seen that the front prism 13 has its principal effect upon the rays on the left side of the optical axis, while the rear prism 12 has its principal effect on the rays on the right hand side of that axis. It will be appreciated that as the prisms 12 and 13 are rotated so that the axial planes or axes thereof more nearly approach a position perpendicular to the optical axis 14, the overall deviation of the light rays will decrease. In the limiting position, where the axes of both the front and rear prisms 12 and 13 are perpendicular to the optical axis 14, there will be no overall deviation of the light rays, and there will neither be compression or expansion of the optical image.

By way of example, in one form of this device, the field angle of the camera lens is 34° and the augmented field angle, the angle between the rays 15 and 17 is 59°. In this particular case, the prism angles are 10° and the prisms are made of water-white spectacle crown glass having an index of refraction of 1.523. The axis of back prism 12 makes an angle of 52½° with the optical axis, and the axis of the front prism 13 makes an angle of 47° with that axis. In such a case, the field angle has been augmented nearly 74 percent.

It will be recognized that the conditions shown in Figure 3 with the light rays 15 and 17 passing, in order, through the front prism 13, the rear prism 12, and the objective lens 10, to the photosensitive surface 11, represents the case of a camera photographing a scene. If the actual scene is as in Figure 2, the image thereof appearing upon the photosensitive surface 11 will be as in Figure 2a. To reverse the process, and to restore the various subjects to their normal proportions, light is passed, in order, through the image located at 11, the objective lens 10, the rear prism 12, and the front prism 13. The light rays 15 and 16 follow the same paths, but travel in reverse direction to that shown in Figure 3.

As is well known, prisms tend to disperse light, separating it into the various colors of the spectrum. This same effect occurs in the form of device shown in Figure 3, and it has been found that under the conditions specified in Figure 3, the separation between red and blue rays at the extreme edges of the field will be in the general neighborhood of 7 minutes. To reduce this separation, and to also permit the augmenting of the field to an even greater extent, the form shown in Figure 5 may be used. In this form, the photosensitive surface 11 and the objective 10 remain the same, but instead of using two prisms, a total of three prisms are used. As indicated, there is a rear prism 12a, an intermediate prism 13a, and a front prism 20. The rear prism 12a corresponds to the rear prism 12 of the form shown in Figure 3, and the intermediate prism 13a corresponds, in part, to the front prism 13 of the previously described form.

From an inspection of Figure 5, it will be noted that the angle of the rear prism 12a is somewhat less than that of the rear prism 12 shown in Figure 3, while the angle of the intermediate prisms 13a is approximately the same as the angle of the front and rear prisms 12 and 13, previously described. In actual practice, the rear prism 12a has an angle approximately one-half that of the intermediate prism 13a, and the front prism 20 has an angle approximately equal to that of the rear prism 12a. The rear prism 12a and the intermediate prism 13a are arranged with respect to each other and with respect to the optical axis 14 of the lens 10, in the same manner as the front and rear prisms 12 and 13 of the previously described form. The front prism 20 is positioned so as to be generally parallel to the rear prism 12a, though spaced therefrom along the optical axis 14.

Because of the symmetrical arrangement of the parts and the angles of the various prisms, it is sometimes helpful to consider the three prism form shown in Figure 5 as the combination of two, two-prism forms, as shown in Figure 3. Thus, if the intermediate prism 13a is considered as being split along its axial plane to divide it into two prisms, the rear half of the total prism 13a cooperates with the rear prism 12a to produce a certain change in the field, in the manner described in connection with Figure 3. The forward half of the total prism 13a then cooperates with the front prism 20 in the same general manner to further modify the field, so that in effect, two separate two-prism systems, placed end-to-end, have been located in front of the objective lens 10. The reason for the larger angle of the intermediate prism 13a is now apparent.

In the form of device shown in Figure 5, the extreme ray 15a from the left hand side of the field first passes through the front prism 20, which increases the angle with respect to the optical axis made by that ray, and then passes through the intermediate prism 13a which causes the ray 15a to travel in a direction more nearly parallel to the optical axis. Finally, the ray passes through the rear prism 12a, which deflects the ray so that it comes within the normal angle of the objective lens 10. In a similar manner, the ray 17a from the extreme right hand edge of the field first encounters the forward prism 20 which deflects the ray so that it thereafter travels in a direction more nearly parallel to the optical axis 14, and then passes through the intermediate prism 13a which deflects the ray toward the optical axis. Finally, the ray 17a passes through the rear prism 12a which again deflects the ray away from the optical axis but leaves it within the normal angle of the lens 10.

By way of example, a very satisfactory system such as that shown in Figure 5, and makes use of prisms constructed of water-white spectacle crown glass having an index of refraction of 1.523, and with the rear prism 12a and the front prism 20 having apex angles of 5°. The intermediate prism 13a has an angle of 10°. If the axial plane of the rear prism 12a and the front prisms 20 make an angle of 48°30' with the optical axis, and the axial plane of intermediate prism 13a makes an angle of 45°45', the augmented field angle of the lens will be about 61° as compared with a normal angle of 34° of the objective lens 10. Thus, the horizontal dimension of the field has been increased or augmented by 80 percent. The average chromatic dispersion of the extreme rays is approximately 2.85', which is approximately ⅓ that of the form shown in Figure 3.

It is interesting to note that in the projection of colored motion pictures, a slight amount of color fringing or dispersion is generally acceptable, where the same amount of dispersion is unacceptable in the case of black and white pictures. In the case of black and white film, the three prism form, shown in Figure 5, thus has a material advantage over the two-prism form shown in Figure 3, because of the smaller dispersion of the red and blue rays. However, because of the fact that there are more glass surfaces, the amount of light transmitted is reduced slightly in the three prism form.

To achieve the desired minimum dispersion and still transmit the maximum possible amount of light, it is desirable to use achromatic prisms formed of two different types of glass. Such a prism is indicated in Figure 6, where the numeral 22 indicates a prism or optical wedge of glass having a somewhat lower index of refraction, and the numeral 23 indicates a second prism or wedge made of a glass having a somewhat higher index of refraction. The base of the prism 22 is placed adjacent the apex of the prism 23, and the base of prism 23 is placed adjacent the apex of prism 22, so that the two prisms, to a certain extent, operate in opposition to each other. The first prism 22, by way of example, may be formed of a glass such as that manufactured by Bausch & Lomb and designated as borosilicate crown glass, type 2, having an index of refraction of 1.5170 for the yellow line of the spectrum, and having an Abbe No. 64.5. The apex angle or prism angle is 11°.

The second prism 23, which cooperates with the first prism 22, may be made of a glass such as that manufactured by Bausch & Lomb and designated as a dense flint, type 2, having an index of refraction of 1.6170 and an Abbe No. of 36.6. The apex angle of the second prism 23 is 4°58'44". The two prisms are cemented together with a suitable optical cement, such as Canada balsam. While other types of glass can be selected to produce very satisfactory results, the two mentioned have proved very satisfactory. They were selected for their overall properties, including the fact that both types of glass are water-white, and thus do not color the light passing through them. The composite prism shown in Figure 6 can be used as both the rear prism 12 and the front prism 13 of the image-control device, shown in Figure 3. Similar prisms can also be used in the three prism device shown in Figure 5, though usually there is little need for achromatic prisms in this latter form.

In order to produce satisfactory results, it has been found necessary to place prism 23, having the higher index of refraction, toward the lens 10 in both the rear prism 12 and the front prism 13. The reverse position produces unsatisfactory results.

It will be apparent from a study of the ray diagram shown in Figures 3 and 5, that while the devices have been described as compressing the field in one meridian, the process will also operate in the reverse manner, and can be used to expand an image in one meridian. Thus, in Figure 3, the rays 15 and 17 have been considered as coming from a normal object or objects, such as the sphere and cube in Figures 1 and 2. After passing through the prisms 12 and 13, the field is compressed in the horizontal meridian, and the objective lens 10 forms an image on the film 11 having the general appearance indicated in Figure 2a. To reverse the process, light is passed through the image on the film 11 and through the objective 10 in the normal manner. Thereafter, the prisms 12 and 13 expand this image in the horizontal meridian, so that the image which appears on the film, and shown in Figure 2a is projected on to a screen in an expanded form and and appears thereon as shown in Figure 2. Thus, the image-controlling device can be used either to expand or to compress an image in one meridian.

From an inspection of Figures 3 and 5, it will be seen that it is not necessary that the prisms all be the same size, and in fact, it is not economical to make them so. The prisms must be of a size to completely cover the cone of light passing through them, but the rear prism 12 may be considerably smaller than the other prisms. For example, a two-prism system such as shown in Figure 3, may make use of a rear prism 12 that is approximately 2 inches square, while the front prism 13 may be approximately 5 inches square, and such prisms will give very satisfactory results over the entire range of angles at which they are normally placed. This feature of using different size prisms for the front and rear prisms is quite important, since it permits the system to be economically constructed.

One of the most important features of the present device is that it can be used with any lens. The anamorphosis occurs entirely in the prisms and the air between them, and does not rely upon cylindrical or spherical lenses forming a part of the objective 10. Consequently, the lens 10 may be of short or long focus or of any aperture. In fact, the compression or expansion of one meridian of the image may be observed by looking through the pair of prisms, without any lens being present. The same image modifier can be used for photographing and projecting pictures, using the standard lenses for both the camera and the projector.

Another feature that is quite important is the fact that by varying the angular positions of the rear prism 12 and the front prism 13, expansion and compression of the image to all different degrees can be obtained. It will be recognized, of course, that the prisms must be rotated in the opposite direction, and by interconnecting the shafts supporting the prism as by pulleys, gears, etc., a single control means can be adjusted to provide any desired degree of expansion or compression. In this way, any desired aspect ratio may be obtained, and the aspect ratio may be changed as the taking or projection of a scene proceeds. Furthermore, it is not necessary to use glass as the principal refracting medium, since hollow prisms, filled with water or other suitable medium, in the manner of the well known water cell, can be used to achieve similar results.

While the image-control devices, illustrated in Figures 3 and 5 have been described as being particularly adaptable for the compression and the expansion of an image for the production of a panoramic or wide screen picture, the devices clearly have other uses. For example, in the projection of motion pictures, it is important to project as much light as possible through the film and onto the screen. In Figure 7 there are indicated some of the basic elements of such a projection system, including a light source 30, such as an arc light, a condensing lens system 31, and aperture 32 across which a film 33 is moved, and an objective or projection lens 34. The light from the source 30 is formed into a high intensity cone that falls upon the rear of the aperture plate, and completely covers the aperture 32. However, as indicated in Figure 8, the aperture 32 is not square, but instead is wider than it is high. As a result, the cone of light falling upon the aperture plate produces an illuminated area whose outline is indicated by the dotted circle 35 of Figure 8. Light within the circle 35 and not within the aperture 32 is wasted, and hence if the shape of the cone can be modified so that more of the light therein passes through the aperture 32, an increased amount of light will reach the screen.

By incorporating the image-modifying system herein described within the path of light traveling to the aperture 32, the effective illumination of that aperture can be increased. Thus, if a pair of prisms 36 and 37 are placed between the condenser lens system 31 and the aperture 32, the prisms being positioned as indicated in Figure 7, and acting to compress the vertical meridian of the cone of light, the projection of the cone onto the aperture plate may be modified to the form shown in solid outline in Figure 8. With such a cone, a greater percentage of the light is passed through the aperture 32, and increased illumination on the projection screen results. In many instances, the increased illumination is sufficient to permit materially reducing the power consumption of the light source 30, thereby decreasing the operating costs of the projector.

Another use of the present invention is to be found in the combination of two of such image-control devices, one in front of the other, and located to compress or expand perpendicular meridians, so that the effect of a variable focal length lens can be obtained. Such a device is indicated schematically in Figure 9, where the numeral 10 indicates an objective lens of any suitable type, mounted to produce an image upon a photo-sensitive surface (not shown). Located in front of the lens 10 is the rear prism 12 and the front prism 13 of a two-prism system, such as shown in Figure 3, and positioned to compress or expand the horizontal meridian of the field of the lens. In front of the prisms 12 and 13 is a second image-modifying system comprising a rear prism 42 and a front prism 43, again similar to the prisms 12 and 13 of the system shown in Figure 3, and located to compress or expand the vertical meridian of an image.

The effect of these two systems is cumulative and complemental, and has the effect of controlling the size of the image recorded upon the film. Thus, as indicated in Figure 10, an image that would normally have the appearance of the larger circle 44, has its vertical meridian compressed, so that after passing through the prisms 42 and 43, the image appears as an ellipse 45. Thereafter, the prisms 12 and 13 compress the horizontal meridian of the ellipse 45 so that the image focused by the lens 10 appears as the smaller circle 46. In this case, the use of the two sets of image-controlling devices has been to cause the objective lens 10 to operate as a wide-angle lens. By rotating the prisms about their respective axes so that the bases of the prisms are nearer the lens 10 than their apexes, the image may be expanded instead of compressed, in which case, the progressive stages through the system would start with a smaller circle 46, enlarge to the ellipse 45, and finally emerge as the larger circle 44.

It will be realized that the movement of the prisms 42 and 43 must be correlated with each other, and the movement of the prisms 12 and 13 must likewise be correlated. Similarly, the movements of the prisms 42 and 43 must be correlated with the movements of prisms 12 and 13 so that expansion and compression of the image in all meridians remains the same, and the change in one meridian does not differ from the change in another meridian. Should the latter occur, a circle or sphere would appear as non-circular in the final image. Simultaneous movement of all prisms 12, 13, 42, and 43 in the proper amount can best be secured by connecting all of them to a single control member which turns them all simultaneously.

From the foregoing, it will be appreciated that there has been disclosed herein an apparatus making use of that apparatus, for expanding or compressing an image in one or more meridians. The system is clearly capable of achieving the objects and securing the advantages heretofore set forth, and while several methods of accomplishing the results, using somewhat different forms of apparatus, have been disclosed, it is clear that other methods and apparatus may be used. Consequently, the invention is not to be restricted to the particular form, arrangement of parts, or sequence of operations herein described and shown, except as limited by the claims.

We claim:

1. An anamorphoscopic device of the type described, intended for use with lenses and similar members adapted to transmit a cone of light, the device including: a support; a first prism mounted on said support, said prism being of a size sufficient to extend completely across said cone and extend a slight distance beyond; a second prism mounted on said support at a point farther removed from the apex of said cone than said first prism and spaced from said first prism, said second prism being larger than said first prism and of a size sufficient to extend completely across said cone and extend a slight distance beyond, both of said prisms being achromatic and each including a portion having a higher index of refraction nearer the apex of said cone and a portion of lower index of refraction farther from said apex, said prisms being at an angle to each other and to the axis of said cone, with the apex of one prism being nearer the base of the other prism, and the base of said one prism being remote from the apex of said other prism, the apex angle of said prism not exceeding approximately 15°; and means for rotating said first and second prisms, each about a corresponding axis, said corresponding axes being substantially parallel to the apexes of said prisms, and substantially perpendicular to the axis of said cone.

2. An anamorphoscopic device of the type described, intended for use with lenses and similar members adapted to transmit a cone of light, the device including: an achromatic support; a first prism mounted on said support with its axial plane angularly positioned with respect to the axis of said cone, said prism being near the apex of said cone and of a size sufficient to extend completely across said cone in all poitions it may assume, said prism including a portion having a higher index of refraction nearer the apex of said cone, and a second portion having a lower index of refraction farther from said apex; and an achromatic second prism mounted on said support with its axial plane making an angle with respect to the axis of said cone substantially equal to that of said axial plane of said first prism but in the opposite direction, so that the angles of said axial planes are substantially supplementary, said second prism being more remote from the apex of said cone than said first prism and of a size sufficient to extend completely across said cone in all positions it may assume, said second prism including a portion having a higher index of refraction nearer the apex of said cone, and a second portion having a lower index of refraction farther from said apex, the apex of one of said prisms being nearer the base of the other of said prisms, and the base of said one of said prisms being remote from the apex of said other prism, the apex angle of said prisms not exceeding approximately 15°.

3. An anamorphoscopic device of the type described, intended for use with lenses and similar members adapted to transmit a cone of light, the device including: a support; an achromatic first prism mounted on said support with its axial plane angularly positioned with respect to the axis of said cone, said prism being near the apex of said cone and of a size sufficient to extend completely across said cone in all positions it may assume, said prism including a portion having a higher index of refraction nearer the apex of said cone, and a second portion having a lower index of refraction farther from said apex; an achromatic second prism mounted on said support with its axial plane making an angle with respect to the axis of said cone substantially equal to that of said axial plane of said first prism but in the opposite direction, so that the angles of said axial planes are substantially supplementary, said second prism being more remote from the apex of said cone than said first prism and of a size sufficient to extend completely across said cone in all positions it may assume, said second prism including a portion having a higher index of refraction nearer the apex of said cone, and a second portion having a lower index of refraction farther from said apex, the apex of one of said prisms being nearer the base of the other of said prisms, and the base of said one of said prisms being remote from the apex of said other prism, the apex angle of said prisms not exceeding approximately 15°; and means for rotating said first and second prisms each about an axis substantially parallel to its apex of and perpendicular to said axis of said cone, said angles of said axial planes with respect to said axis of said cone being substantially supplementary in all usable positions of said prisms.

4. An anamorphoscopic device of the type described, intended for use with lenses and similar members adapted to transmit a cone of light, the device including: a support; a first prism mounted on said support and comprising a pair of optical wedges mounted in opposition to each other, one of said wedges having a higher index of refraction than the other, and being nearer the apex of said cone, the axial plane of said prism being angularly positioned with respect to the axis of said cone, said prism being near the apex of said cone and of a size sufficient to extend completely across said cone in all positions it may assume; a second prism mounted on said support and comprising a pair of optical wedges mounted in opposition to each other, one of said wedges having a higher index of refraction than the other and being nearer the apex of said cone, the axial plane of said second prism making an angle with respect to the axis of said cone substantially equal to that of said axial plane of said first prism but in the opposite direction, so that the angles of said axial planes are substantially supplementary, said second prism being more remote from the axis of said cone than said first prism and of a size sufficient to extend completely across said cone in all positions it may assume, the apex of one of said prisms being nearer the base of the other of said prisms, and the base of said one of said prisms being remote from the apex of said other prism, the apex angle of said wedges constituting said first and second prisms not exceeding approximately 15°; and means for rotating said first and second prisms each about an axis substantially parallel to its apex and perpendicular to said axis of said cone, said angles of said axial planes with respect to said axis of said cone being substantially supplementary in all usable positions of said prisms.

References Cited in the file of this patent

UNITED STATES PATENTS

| Number | Name | Date |
| --- | --- | --- |
| 818,553 | Phillips | Apr. 24, 1906 |
| 1,307,598 | Phillips | June 24, 1919 |
| 1,328,291 | Parker | Jan. 20, 1920 |
| 1,758,801 | Moses | May 13, 1930 |
| 1,853,778 | Rayton | Apr. 12, 1932 |
| 1,898,787 | Newcomer | Feb. 21, 1933 |
| 1,905,442 | Coors | Apr. 25, 1933 |
| 1,918,488 | Rackett | July 18, 1933 |
| 1,931,992 | Newcomer | Oct. 24, 1933 |
| 2,023,217 | Benford | Dec. 3, 1935 |
| 2,048,284 | Newcomer | July 21, 1936 |
| 2,088,660 | Newcomer | Aug. 3, 1937 |
| 2,180,031 | Carlson | Nov. 14, 1939 |
| 2,236,420 | Bergmans et al. | Mar. 25, 1941 |
| 2,375,634 | Dunning | May 8, 1945 |

FOREIGN PATENTS

| Number | Country | Date |
| --- | --- | --- |
| 8,512 | Great Britain | of 1898 |
| 338,962 | Great Britain | Dec. 1, 1930 |
| 250,784 | Germany | Sept. 18, 1912 |